(12) United States Patent
Bordawekar et al.

(10) Patent No.: US 11,741,099 B2
(45) Date of Patent: Aug. 29, 2023

(54) SUPPORTING DATABASE QUERIES USING UNSUPERVISED VECTOR EMBEDDING APPROACHES OVER UNSEEN DATA

(71) Applicant: INTERNATIONAL BUSINESS MACHINES CORPORATION, Armonk, NY (US)

(72) Inventors: Rajesh Bordawekar, Westchester, NY (US); Apoorva Nitsure, Pittsburgh, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 17/187,841

(22) Filed: Feb. 28, 2021

(65) Prior Publication Data
US 2022/0277008 A1 Sep. 1, 2022

(51) Int. Cl.
*G06F 17/00* (2019.01)
*G06F 16/2453* (2019.01)
*G06N 5/04* (2023.01)
*G06N 20/00* (2019.01)

(52) U.S. Cl.
CPC ......... *G06F 16/24542* (2019.01); *G06N 5/04* (2013.01); *G06N 20/00* (2019.01)

(58) Field of Classification Search
CPC ..... G06F 16/24542; G06N 5/04; G06N 20/00
See application file for complete search history.

(56) References Cited

U.S. PATENT DOCUMENTS

| | | | |
|---|---|---|---|
| 10,528,909 B2 | 1/2020 | De Mars | |
| 10,719,301 B1 | 7/2020 | Dasgupta | |
| 11,416,518 B2* | 8/2022 | Elliman | G06F 16/285 |
| 2011/0040711 A1* | 2/2011 | Perronnin | G06K 9/6269 |
| | | | 706/46 |
| 2016/0379128 A1* | 12/2016 | Bouchard | G06F 21/6263 |
| | | | 706/12 |
| 2018/0322403 A1 | 11/2018 | Ron | |
| 2020/0327445 A1* | 10/2020 | Yu | G06N 20/00 |

(Continued)

OTHER PUBLICATIONS

Espinosa-Anke, L. et al.; "Seven: Augmenting Word Embeddings With Unsupervised Relation Vectors"; Proceedings of the 27th International Conference on Computational Linguistics (2018); pp. 2653-2665.

(Continued)

*Primary Examiner* — Greta L Robinson
(74) *Attorney, Agent, or Firm* — Intelletek Law Group, PLLC; Gabriel Daniel, Esq.

(57) ABSTRACT

A computer-implemented method of performing queries using Artificial Intelligence (AI) database embeddings includes the operations of generating a plurality of vector embeddings describing a training data from a database for training a machine learning model. A test vector embedding is generated from the plurality of vector embeddings based on training data for unseen data from one or more rows of the database. One or more vectors from the plurality of vector embeddings describing the training data that are a closest match to the test vector embedding are identified. A task is determined based upon the unseen data. The determined task is performed using the trained machine learning model.

20 Claims, 18 Drawing Sheets

(56) References Cited

U.S. PATENT DOCUMENTS

2021/0089970 A1* 3/2021 Zeise .................... G06N 20/10
2022/0155281 A1* 5/2022 Victors ............ G01N 35/00069

OTHER PUBLICATIONS

Anonymous, "Extracting Point of Interest Information From Query Logs"; IPCOM000252095D ip.com (2017); 33 pgs.

Anonymous, "Incremental Sharing Using Machine Learning"; IPCOM000252683D ip.com (2018); 33 pgs.

Lee, et al., "Method and System for Joint Embedding of Query and Ad By Leveraging Implicit Feedback"; IPCOM000257007D ip.com (2019); 4 pgs.

Le, Q. et al., "Distributed Representations of Sentences and Documents"; Proceedings of the 31st International Conference on Machine Learning (2014); Beijing, China JMLR: W&CP vol. 32; 9 pgs.

Liu, C. et al., "Unsupervised Document Embedding With CNNS"; arXiv:1711.04168v3 [cs.CL] (2018); 10 pgs.

Yadwadkar, N., "Machine Learning for Automatic Resource Management in the Datacenter and the Cloud"; Electrical Engineering and Computer Sciences University of California at Berkeley, Technical Report No. UCB/EECS-2018-110 (2018); 125 pgs.

Arora, S. et al., "A Simple but Tough-To-Beat Baseline for Sentence Embeddings"; ICLR (2017); 16 pgs.

Mell, P. et al., "Recommendations of the National Institute of Standards and Technology"; NIST Special Publication 800-145 (2011); 7 pgs.

\* cited by examiner

AI-Powered Database Prediction: Raw Data

Test Query

| User | Card | Year | Month | Day | Time | Amount | Use Chip | Merchant Name | Merchant City | Merchant State | Zip | MCC | Errors? |
|---|---|---|---|---|---|---|---|---|---|---|---|---|---|
| 1346 | 0 | 2008 | 11 | 11 | 12:23 | $62.55 | Swipe Transaction | Fake Store | Sunnyvale | CA | 94086.0 | 6499 | NaN |

No Is_fraud field
No transaction ID — 330

305

Training Set

| Trx ID | User | Card | Year | Month | Day | Time | Amount | Use Chip | Merchant Name | Merchant City | Merchant State | Zip | MCC | Is Fraud? | Errors? |
|---|---|---|---|---|---|---|---|---|---|---|---|---|---|---|---|
| 22489552 | 1882 | 0 | 2016 | 4 | 4 | 10:01 | $2.48 | Chip Transaction | Fake Restaurant 1 | Ellis Grove | IL | 62241 | 5812 | No | NaN |
| 23458736 | 1415 | 3 | 2011 | 8 | 8 | 13:11 | $12.51 | Swipe Transaction | Fake Joe's Store | Palm Coast | FL | 32137 | 5411 | No | NaN |
| 14894561 | 1083 | 0 | 2018 | 3 | 3 | 8:41 | $69.67 | Chip Transaction | Fake Gray Hair Cutting | Leesville | SC | 29070 | 7230 | No | NaN |
| 72866888 | 542 | 1 | 2001 | 7 | 7 | 20:20 | $37.07 | Swipe Transaction | Fake Theater | Jamaica Plain | MA | 2130 | 7832 | No | NaN |
| 6459650 | 488 | 1 | 2009 | 11 | 11 | 7:04 | $3.73 | Swipe Transaction | Fake Kase's Eats | Lake Villa | IL | 60046 | 5812 | No | NaN |
| 9521237 | 700 | 1 | 2016 | 11 | 11 | 11:10 | $33.27 | Online Transaction | Fake CAB | ONLINE | NaN | NaN | 4121 | No | NaN |

Test Query

USER||346 CARD||0 YEAR||2008 MONTH||11 DAY||1 TIME||12 AMOUNT||0
405 — USE_CHIP||SWIPE_TRANSACTION
MERCHANT_NAME||7-11 MERCHANT_CITY||SUNNYVALE MERCHANT_STATE||NY ZIP||94086
MCC||5499 ERRORS||NONE
USER_CARD||3260

425 — No IS_FRAUD field
No PK_ID

Training Set

420

415 — ['PK_ID||25489552 USER||882 CARD||0 YEAR||2016 MONTH||4 DAY||10 TIME||10 AMOUNT||0 USE_CHIP||CHIP_TRANSACTION MERCHANT_NAME||CHILES MERCHANT_CITY||ELLIS_GROVE MERCHANT_STATE||IL ZIP||62241 MCC||5812 IS_FRAUD||NO ERRORS||NONE USER_CARD||8820\n',

'PK_ID||20458756 USER||515 CARD||3 YEAR||2011 MONTH||8 DAY||25 TIME||13 AMOUNT||1 USE_CHIP||SWIPE_TRANSACTION MERCHANT_NAME||ALBERTSONS COS MERCHANT_CITY||PALM_COAST MERCHANT_STATE||FL ZIP||32137 MCC||5411 IS_FRAUD||NO ERRORS||NONE USER_CARD||5153\n',

'PK_ID||4494571 USER||083 CARD||0 YEAR||2018 MONTH||3 DAY||11 TIME||9 AMOUNT||6 USE_CHIP||CHIP_TRANSACTION MERCHANT_NAME||GRAY HAIR CUTTING MERCHANT_CITY||LEESVILLE MERCHANT_STATE||SC ZIP||29070 MCC||7230 IS_FRAUD||NO ERRORS||NONE USER_CARD||0830\n',

'PK_ID||7296888 USER||542 CARD||1 YEAR||2001 MONTH||7 DAY||10 TIME||20 AMOUNT||3 USE_CHIP||SWIPE_TRANSACTION MERCHANT_NAME||DENI'S THEATERS MERCHANT_CITY||JAMAICA_PLAIN MERCHANT_STATE||MA ZIP||2130 MCC||7832 IS_FRAUD||NO ERRORS||NONE USER_CARD||5321\n',

'PK_ID||6459950 USER||488 CARD||1 YEAR||2009 MONTH||1 DAY||1 TIME||17 AMOUNT||0 USE_CHIP||SWIPE_TRANSACTION MERCHANT_NAME||KASE'S EATS MERCHANT_CITY||LAKE_VILLA MERCHANT_STATE||IL ZIP||60046 MCC||5812 IS_FRAUD||NONE USER_CARD||4881\n',

'PK_ID||9521237 USER||700 CARD||1 YEAR||2016 MONTH||1 DAY||21 TIME||11 AMOUNT||1 USE_CHIP||ONLINE_TRANSACTION MERCHANT_NAME||UBER MERCHANT_CITY||ONLINE MERCHANT_STATE||EMPTY ZIP||EMPTY MCC||4121 IS_FRAUD||NO ERRORS||NONE USER_CARD||7001\n']

FIG. 4

FIG. 5

Row-Wise Prediction

- Entity Resolution or Pattern identification involve identifying rows in the training data which are similar to a given test row
- The prediction method designed to achieve these tasks is performed by:

Calculate certain statistics based on the training data:
- Influence and Discriminator Score (per column)
- Corpus, Column based relative frequency and inverse frequency Upon receiving a test row:
1. Textify the test row to be in an AIDB readable format
2. Generate a vector for the test row T
3. Find nearest neighbors of T depending on the type (Most Commonly the Primary Key)
4. Choose the result set as either top n neighbors or neighbors having cosine similarity over a threshold th.

FIG. 6

Vector Generation test_vec: generated vector of the test example
(initialized to zeros of same vector length
as tokens in the AIDB model)

For token t in test row:
If t present in AIDB model:
vec = vector associated with t from AIDB model
Provide weight(w) to this vector by checking if it
has an acceptable Influence & Discriminator score
and then generating a holistic weight value encompassing
the tokens frequency with the help of a modified bm25
/smoothing inverse function approach
test_vec += w*vec

710

700

705
- Create a weighted average of the vectors of tokens of the test row
- Use this vector to represent the test row

$$\text{score}(D, Q) = \sum_{i=1}^{n} \text{IDF}(q_i) \cdot \frac{f(q_i, D) \cdot (k_1 + 1)}{f(q_i, D) + k_1 \cdot \left(1 - b + b \cdot \frac{|D|}{\text{avgdl}}\right)}$$

Given a query Q containing keywords q1...qn, the BM25 score of a document D is shown in the figure where f(qi, D) is the frequency of qi in D, |D| is the length of the document in words, avgdl is the average length of documents in a collection, k₁ & b are free parameters and lastly IDF means the Inverse Document Frequency of qi

FIG. 8A

BM25 Modified

- The BM25 method is modified and implemented such that for a test row tr with t tokens every token's vector is assigned a weight by BM25 and then added to produce a single vector for tr
- The sentence length for the textified data is calculated as the number of non-null values in a row and the average sentence length is calculated from the textified training data
- Instead of IDF, the discriminatory score (sum of proportion of unique values in a column) for a column is assigned

FIG. 9B

Smoothing Inverse Function

- A test row embedding is constructed by assigning weight to token vectors which are chosen based on high influence and discriminatory score
- The weight is its inverse frequency from training data
- These vectors are then averaged to produce the representative test row vector

FIG. 8C

Results Returned By The Prediction Query

```
vals_res1 = [val.rsplit("!!")[1].lower().replace('_','-') for val in vals_res1]

mdm_data.iloc[pd.Index(mdm_data['ID']).get_indexer(vals_res1)]
```

| ID | MDM_TYPE | SERIAL_1 | SERIAL_2 | FIRST_NAME | LAST_NAME | SSN |
|---|---|---|---|---|---|---|
| 702442 0652fe2-3533-4939-bb7e-3abb462ec975 | MDMPER | 564603 | 702443 | DAVID | MARTIN | 100-59-7435 315-... |
| 702440 1274981-cc72-48d8-bd8b-bf697d19c9a2 | MDMPER | 564603 | 702441 | DAVID | MARTIN | 100-59-7453 315-... |
| 702441 0fd8cf3-fec4-44fd-aa10-4fbc76767f0a | MDMPER | 564603 | 702442 | DAVID | M | 100-59-7453 |

```
train_mdm_true = [line[0] for line in train if "SERIAL_1!!564603" in line]

true_ids = [val.rsplit("!!")[1].lower().replace('_','-') for val in train_mdm_tr get_nums(true_ids, vals_res1)

{'Accuracy': 1, 'Recall': 1.0, 'Precision': 1.0}
```

FIG. 10B

SUPPORTING DATABASE QUERIES USING UNSUPERVISED VECTOR EMBEDDING APPROACHES OVER UNSEEN DATA

BACKGROUND

Technical Field

The present disclosure generally relates to systems and methods for computer Artificial Intelligence Database (AIDB) queries, and more particularly, to providing AIDB queries using unsupervised vector embeddings.

Description of the Related Art

AI-powered databases use semantic vector representation of relational entities to generate additional types of Structured Query Language (SQL) analytical queries such as cognitive intelligence queries. Cognitive intelligence queries can improve a user's search query by using semantic matching and retrieving relevant information from a plurality of diverse data sets. The semantic vectors used in cognitive intelligence queries are generated from an unstructured representation of the structured relational data. However, in the case of unseen data, which is data that has not been used for training an AIDB model, can only undergo an exploratory analysis. Conventional systems lack an ability to execute any existing cognitive intelligence queries for unseen data.

As client interest grows in the use of AIDB queries, there is a growing need for wider applicability and usefulness of AIDB methodology. For example, there is a desire to support multiple SQL types for functions such as prediction.

SUMMARY

According to one embodiment, a computer-implemented method of performing queries using Artificial Intelligence (AI) database embeddings includes generating a plurality of vector embeddings describing a training data from a database for training a machine learning model. A test vector embedding is generated using the trained plurality of vector embeddings for unseen data including one or more rows of the database. A task is determined based upon the unseen data. The determined task is performed using the trained machine learning model. One or more vectors are identified from the plurality of vector embeddings describing the training data that are a closest match to the test vector embeddings or test vector attributes. This method enables an inference to be made about the unseen data using, for example, a prediction query. In addition, support is provided for a plurality of functions including classification and data imputation. This method can be used with other cognitive intelligence queries including but not limited to similarity, inductive reasoning, and semantic clustering.

According to an embodiment, the training of the machine learning model is unsupervised. The unsupervised training of the machine learning model provides for a way to generate an inference about the unseen data that is more efficient and more accurate than from supervised training. There is an improvement in the processing of unseen data.

According to an embodiment, the generated trained vector embeddings describe the training data for training a machine learning prediction model, the determined task is a prediction task on unseen data, and the method further includes performing the prediction task using the trained machine learning prediction model. The use of the generated trained vector embeddings provides for a more efficient and more accurate prediction model.

According to an embodiment, the determined task that is performed includes filling in missing values in the database. The imputation of missing/null values renders more accurate results.

According to an embodiment, the weighted averages are computed by performing a Modified Best Matching (BM) 25 operation using AIDB specific metrics and a modified average sentence length combined with an Inverse Document Frequency (IDF) to generate weights for token vectors. This embodiment provides an improvement in the operation of a Best Matching 25 operation (referred to as a "Modified Best Matching 25" operation herein) through at least the use of the AIDB specific metrics and modified average sentence length.

According to an embodiment, the weighted averages are computed by performing a Smoothing Inverse Frequency (SIF) operation including performing test row embedding by assigning a weight to one or more token vectors that are selected based on a high influence and discriminatory score, wherein the assigned weight for each token vector is its inverse frequency from training data, and averaging the token vectors to produce a representative test row vector. The SIF operation provides an alternative method to assigning weight than the Modified Best Matching 25 operation.

According to an embodiment, the determined task is a classification operation including generating vectors of the unseen data using weighted averages for combinations of tokens in a test row of the unseen data, and voting among the generated vectors is based on a highest cosine similarity. The ability to perform a classification operation including generating vectors of the unseen data using weighted averages is a novel additional functionality of computer operations.

According to an embodiment, the generated vectors are by using a pointwise mutual information (PMI) of the combination of tokens in the test row.

According to an embodiment, the determined task that is performed is a row-matching operation. The ability to perform a row matching operation with improved accuracy is enhanced.

According to an embodiment, the determined task that is performed is a Cognitive Intelligence Query for unseen data. Heretofore, only exploratory analysis of unseen data could be performed, and this embodiment provides an improvement in computer operations.

According to one embodiment, a computer-implemented method of performing queries using Artificial Intelligence database (AIDB) embeddings includes textifying training data from a database including generating data specific statistics. A model is trained using the AIDB with the textified training data. An unseen data row is analyzed, and a prediction task is determined based upon the unseen data. The determined prediction task is performed. Textifying the training data permits a more accurate way to train a machine learning model that can perform tasks on unseen data.

According to an embodiment, the computer-implemented method includes performing the prediction task. At least an interpretability score is provided. The interpretability score proves an improvement in determining the accuracy of the performed prediction task.

According to one embodiment, a computing device for performing queries using Artificial Intelligence database (AIDB) embeddings includes a processor, and a memory coupled to the processor, the memory storing instructions to cause the processor to perform acts including generating a plurality of vector embeddings describing a training data from a database resulting from unsupervised training of a machine learning model. A test vector embedding is generated for unseen data including one or more rows of the database. One or more vectors are identified from the plurality of vector embeddings describing the training data that are a closest match to the test vector embedding. A task is determined based upon the unseen data, and the determined task is performed using the trained machine learning model. The computing device enables an inference to be made about the unseen data using, for example, a prediction query. In addition, support is provided for a plurality of functions including classification and data imputation. The computing device can perform other cognitive intelligence queries including but not limited to similarity, inductive reasoning, and semantic clustering. The unsupervised training of the machine learning model provides for a way to generate an inference about the unseen data that is more efficient and more accurate than from supervised training.

According to an embodiment, the determined task is a prediction task. The prediction task is performed using the trained machine learning prediction model. An improvement in the processing of unseen data is provided through the use of training the machine learning model with unsupervised training.

According to an embodiment, the prediction task is a classification operation. The processor is configured with instructions to generate vectors representing the unseen data using weighted averages for combinations of vectors representing tokens in a test row of the unseen data and a voting operation is performed to rank the generated vectors based on a highest cosine similarity. The processing of unseen data that includes voting, vector generation, or an ensemble of voting and a vector generation, is an improvement in the processing of unseen data.

According to an embodiment, the prediction task is a row matching operation. The ability to perform a row-matching operation on unseen data is an improvement over any conventional operations.

According to an embodiment, the prediction task is a semantic analysis using Cognitive Intelligence Queries. Prediction tasks could not be previously performed on unseen data using Cognitive Intelligence Queries.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 3 illustrates an Artificial Intelligence-powered database (AIDB) prediction using raw credit card data, consistent with an illustrative embodiment.

FIG. 4 illustrates an example of textified training data in an Artificial Intelligence-powered database (AIDB), consistent with an illustrative embodiment.

FIG. 5 illustrates a database embedding model of a relational table that has been textified, consistent with an illustrative embodiment.

FIG. 6 illustrates an example of a row-wise prediction operation, consistent with an illustrative embodiment.

FIG. 7 illustrates an example of a vector generation operation, consistent with an illustrative embodiment.

FIGS. 8A and 8B are illustrations of a modified Best Matching (BM25) operation, consistent with an illustrative embodiment.

FIG. 8C is an overview of a Smoothing Inverse Function, consistent with an illustrative embodiment.

FIGS. 10A and 10B show results operations using a prediction technique, consistent with an illustrative embodiment.

DETAILED DESCRIPTION

Overview

Figure 1:
FIG. 1 provides an example of a workflow configured for training a machine learning model using an Artificial Intelligence-powered database (AIDB) to perform a task, consistent with an illustrative embodiment.

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

The term "Artificial Intelligence power database" (AIDB) as used herein generally refers to a database which employs an unsupervised neural network model to generate database embeddings to enable semantic matching through cognitive intelligence queries The term "test data" is unseen data that has not been analyzed by a trained data model.

In conventional AI-powered databases, the semantic vectors are generated from an unstructured representation of the structured relational data. Currently, a relational row is viewed as a "sentence" in the unstructured text. In addition, the unstructured representation should be able to support multiple SQL data types. Cognitive Intelligence Queries were previously used to provide only an exploratory analysis of the data.

In the case of a prediction query, the prerequisites may include a trained AIDB model (vector embeddings) exists for similar data, and an inference regarding an incoming row which was unseen to the model is to be found, and there is familiarity with a task (e.g., row matching, classification, semantic analysis using cognitive intelligence queries).

According to the present disclosure, a prediction query enables an AI-Powered Database (AIDB) support prediction in which an AIDB model is trained and used for unseen data. There are multiple methodologies depending on the task, including row-matching (e.g., entity resolution, pattern identification), classification (class label prediction), similarity-based Cognitive Intelligence Queries (e.g., inductive reasoning). The unseen data is converted into an AIDB recognizable format through textification. Depending on the task, the converted unseen data is provided to a prediction processing module and results are obtained. The particular prediction processing module is available through User-Defined Functions (UDFs) which can be invoked on unseen data through SQL.

The computer-implemented method and computing device of the present disclosure provides a number of improvements in the processing of unseen data for a multitude of tasks using an AIDB. For example, an unsupervised approach in the present disclosure is enabled rather than a traditionally supervised learning task in AIDB to increase the predictability and classification of unstructured data. In addition, a data agnostic operation for a general model building having a specific inference can be used. The improvements further include the ability to predict any column from the structured data, and interpretable and transparent operations are performed as compared with other deep learning approaches for structured data. The Artificial intelligence-powered database operations of the present disclosure can handle null values and provide imputation. Another improvement is the ability to execute any existing cognitive intelligence queries for unseen data.

The computer-implemented method and computing device of the present disclosure also improves the efficiency of computer operations by reducing unnecessary computer processing due to more accurate data predictions and classification. A reduction in processing overhead and storage can be realized, with a reduction in power consumed.

Additional advantages of the computer-implemented method and device of the present disclosure are disclosed herein.

Example of Training a Machine Learning Model

FIG. 1 provides an example of a workflow 100 configured for training a machine learning model using an Artificial Intelligence-powered database (AIDB) to perform a task, consistent with an illustrative embodiment. At an input data stage 105, data may be acquired from an AIDB. The data is textified and data specific statistics can be generated. In the textification process, hidden information may be extracted and represented by text tokens projected into a semantic vector. At training stage 110, a machine language model is trained using AIDB with the input data. The training of the model is unsupervised because of the vector embeddings of the database.

At test data stage 115, the unseen data is textified. In this illustrative embodiment, a prediction task is determined based on the unseen data. However, virtually any task can be performed, including but not limited to, classification, row-matching, entity resolution, or semantic analysis using cognitive intelligence queries, etc.

At prediction stage 120, a method of operation is automatically selected based on the task, and an interpretability or other score may be provided. New kinds of SQL analytics queries are enabled to provide more accurate information about unseen data.

Figure 2:
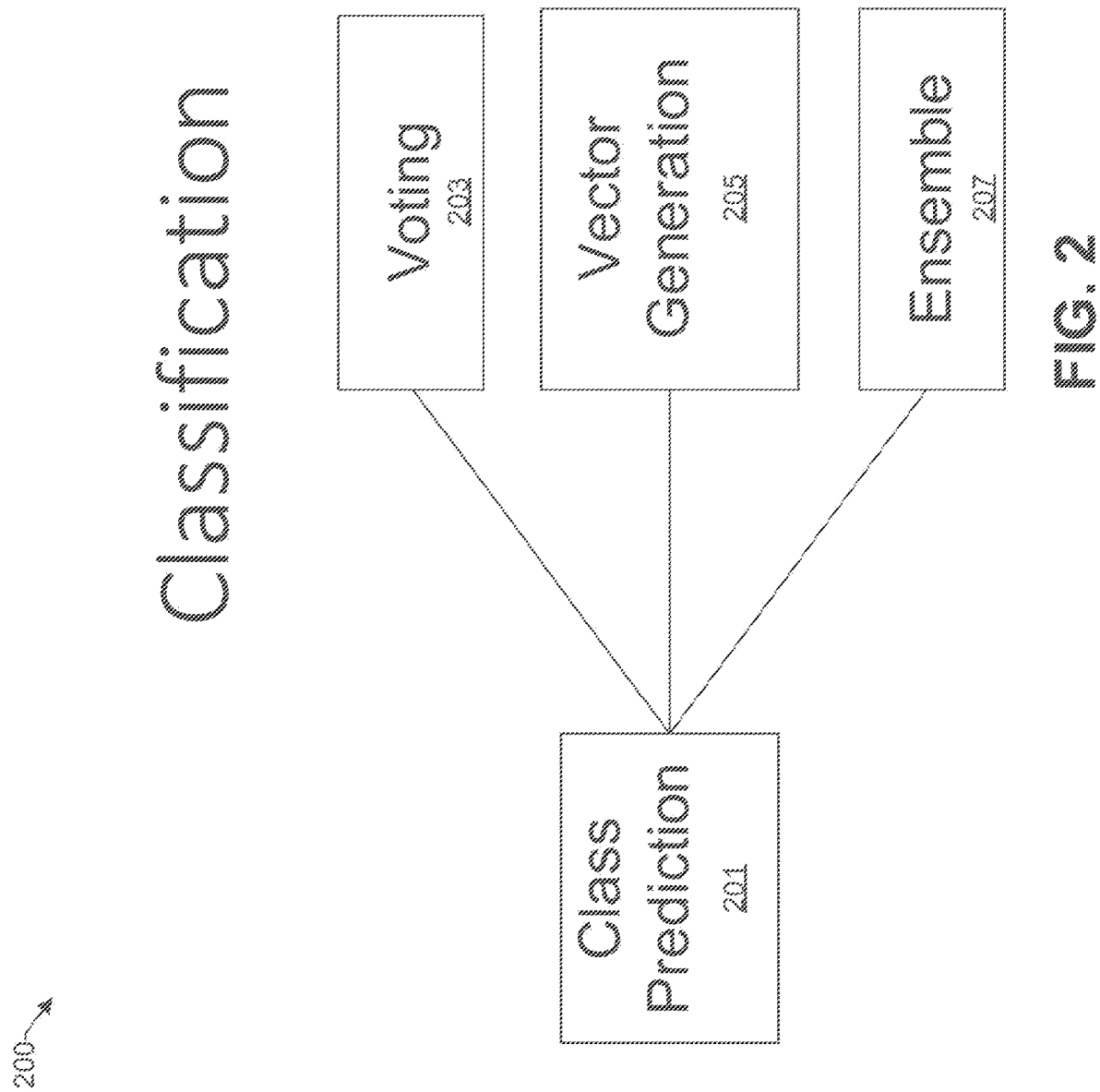
FIG. 2 illustrates a classification operation, consistent with an illustrative embodiment.

FIG. 2 illustrates a classification operation 200, consistent with an illustrative embodiment. The class prediction 201 can be performed through either voting 203, or vector generation 205, or an ensemble 207, which is an amalgamation of both the voting 203 and the vector generation 205. The predicting method for this task includes suggesting a present value in the domain of a column that is to be predicted.

FIG. 3 illustrates an AIDB prediction 300 using raw card data as an example, consistent with an illustrative embodiment. A test query 305 and a training set 315 are shown. The test query is used to predict whether the credit card purchases are fraudulent. For example, the test query can be used to predict whether an unauthorized user has accessed the system and entered a transaction that is fraudulent (e.g., fake). The machine learning model has been trained by the training set 315, and as shown by the merchant names, all of the merchants are fake. In comparing the test query 305 with the training set 315, there is a transaction id 320 and a fraud prompt 325 shown in the training set 315. However, the test query 305 is lacking the transaction id 320 and the fraud prompt 325, as indicated in annotation 330. Thus, if a prediction task is performed on the unseen data in test query 305, the result is the unseen data is predicted to be fraudulent.

FIG. 4 illustrates an example of textified training data 400 in an AIDB, consistent with an illustrative embodiment. The test query 405 and the training set 415 are shown. The textified form of unseen data indicates a no fraud field 420, and the annotation 425 provides information about no fraud field and no primary key PK_ID.

FIG. 5 illustrates a database embedding model 500 of a relational table that has been textified, consistent with an illustrative embodiment. The relational table 520 is embedded with the textification data such as customer id, merchant, state, category, items purchased, and amount. A relation row 525 is shown and the textification 530 of the data.

FIG. 6 illustrates an example of a row-wise prediction operation 600, consistent with an illustrative embodiment. Row-wise prediction can be used in many tasks, including but not limited to entity resolution or pattern identification. At 605 it is shown that certain statistics are calculated based on the training data. For example, an Influence and Discriminator score per column can be calculated. Additional calculations may be performed for a corpus, a column based relative frequency, and/or an inverse frequency.

Still referring to FIG. 6, upon receiving a test row, a number of operations 610 are performed. For example, there is a textification of the test row to convert the information into an AIDB readable format. A vector is generated for the test row (T). The nearest neighbors of T are found depending on the type (e.g., a Primary key). A result is chosen as either the top n neighbors or neighbors having a cosine similarity over a threshold (threshold "th"). The unseen data is compared with the training data to identify the training rows most similar to the test row.

FIG. 7 illustrates an example of a vector generation operation 700, consistent with an illustrative embodiment. In vector generation there can be created a weight average 705 of the vector of tokens in the test row. The weighted average of the vectors can represent the test row. An illustration of vector generation procedure 710 is shown that includes a modified version of best match (BM) 25. The modified version of BM25 is discussed with reference to FIGS. 8A and 8B.

FIGS. 8A and 8B are illustrations 800A, 800B of a modified Best Matching (BM25) operation, consistent with an illustrative embodiment. FIG. 8A shows an equation 810 given a query Q of a document D. BM25 is a ranking function that can estimate the relevance of documents to a given search query. BM25 is often used by search engines to determine relevance of documents to provide in response to a search request.

In FIG. 8B, according to this illustrative embodiment, the bm25 algorithm is modified to use AIDB specific metrics such as an Influence & Discriminator score as well as a modified average sentence length combined with Inverse Document Frequency (IDF) to generate weights for token vectors. The average sentence length 860 is calculated by averaging the row length for the rows in the textified training data. The sentence length for a row of textified training data is calculated as the number of non-null values in that row. For a test row tr with tokens t, every token's vector is assigned a weight as mentioned above and then averaged to produce a single vector for tr. In addition, unlike IDF shown in FIG. 8A, a discriminatory score that is a sum of proportions of unique values in a column is assigned.

FIG. 8C is an overview of a Smoothing Inverse Function (SIF), consistent with an illustrative embodiment. In vector generation, where a vector is generated for an unseen row, a weighted average of vectors (generated using training data) that represent tokens in the unseen row is computed. SIF is one of the ways that the weights can be assigned (modified BM25 as described above is another way to assign the weights). For example, the use of an SIF can determine a representative test row vector. FIG. 8C shows at 880 a test row embedding is constructed by assigning weights to token vectors which are chosen based on a high Influence and Discriminator score. At 890, it is expressed that the assigned weight is the inverse frequency from training data. At 895, the vectors are then averaged to produce the representative test row vector.

Figure 9:
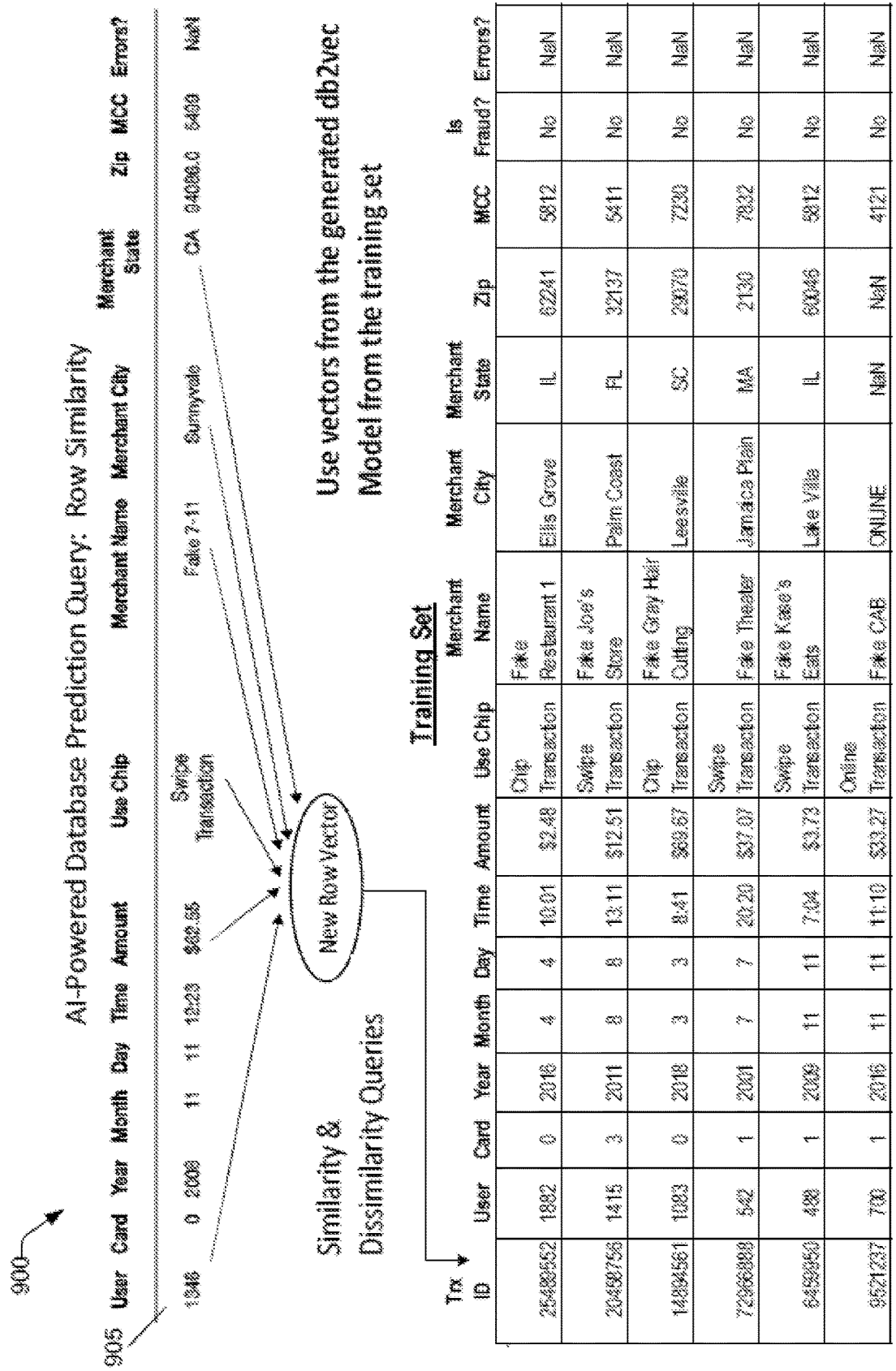
FIG. 9 is an illustration of the use of row similarity in an Artificial Intelligence-powered database (AIDB) Query, consistent with an illustrative embodiment.

FIG. 9 is an illustration of the use of row similarity 900 in an AIDB Query, consistent with an illustrative embodiment. In FIG. 9, a test row 905 is compared with training data from a training set to create a new row vector.

Figure 10A:
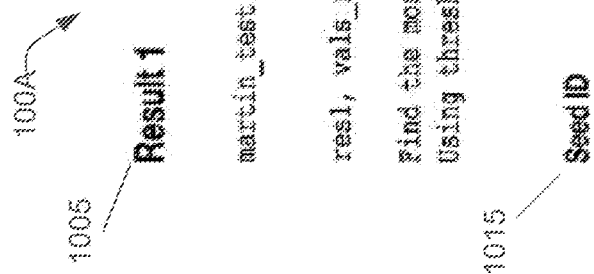

FIGS. 10A and 10B show results operations 100A, 100B using a prediction technique, consistent with an illustrative embodiment. The figures represent the entity matching task for prediction queries. A vector is created for the seed id row, t, using the appropriate row matching algorithm mentioned in the presentation. All primary key vectors are found from the trained model which have cosine similarity with t which is above the threshold 0.85 and report that as the result. For example, FIG. 10A shows that given an unknown test row, existing instances are found from the training data that are similar to it over a threshold. In this illustrative embodiment, the threshold is 0.85, the disclosure is not limited to this value. The result 1005 and the seed ID 1015 are shown. FIG. 10B shows a holistic matching with accuracy, precision, and recall showing results 1050 returned by the prediction query.

Example Process

Figure 11:
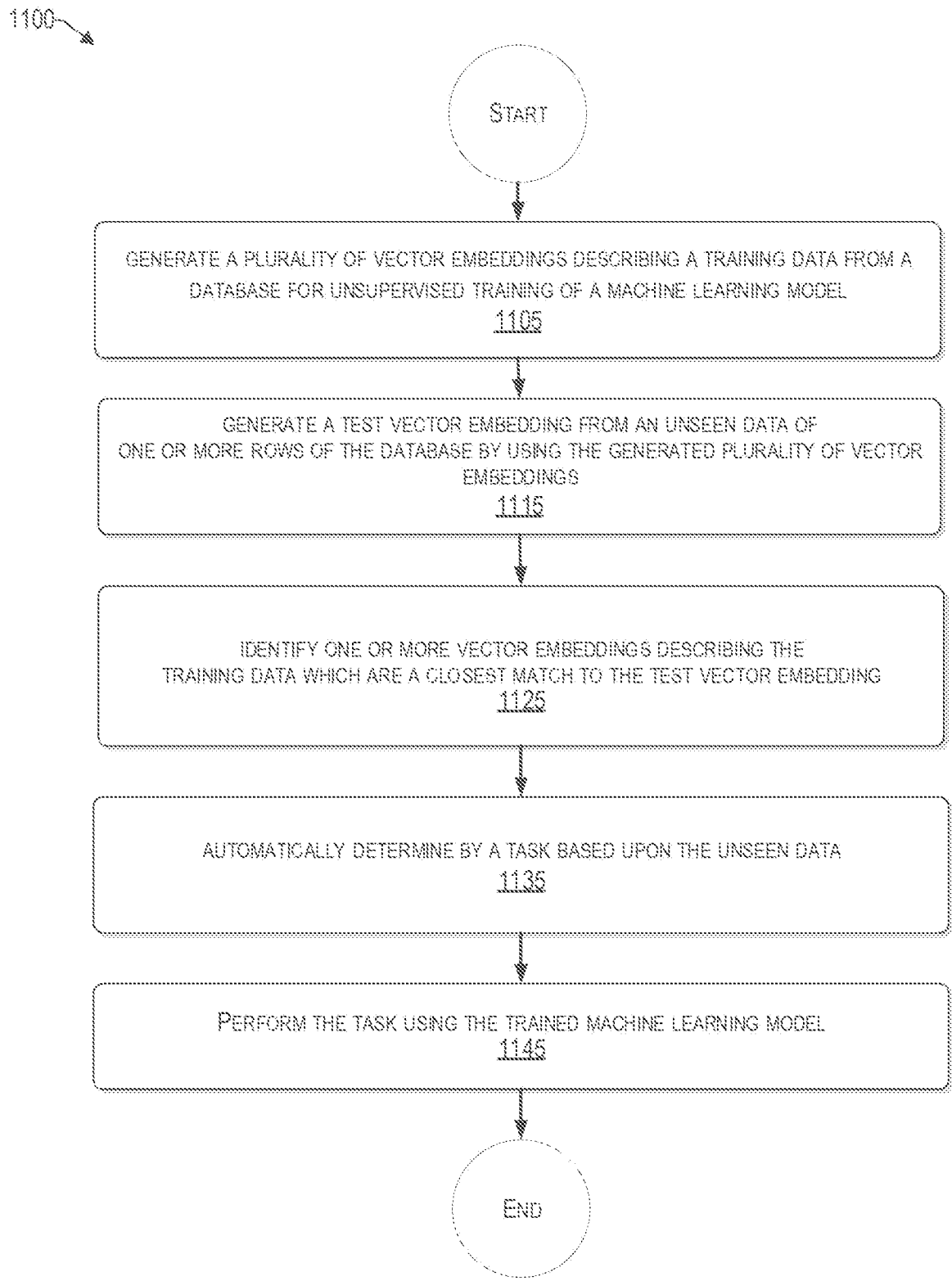
FIG. 11 is a flowchart illustrating a computer-implemented method of performing a task based on an Artificial Intelligence-powered database (AIDB) training model, consistent with an illustrated embodiment.
Figure 12:
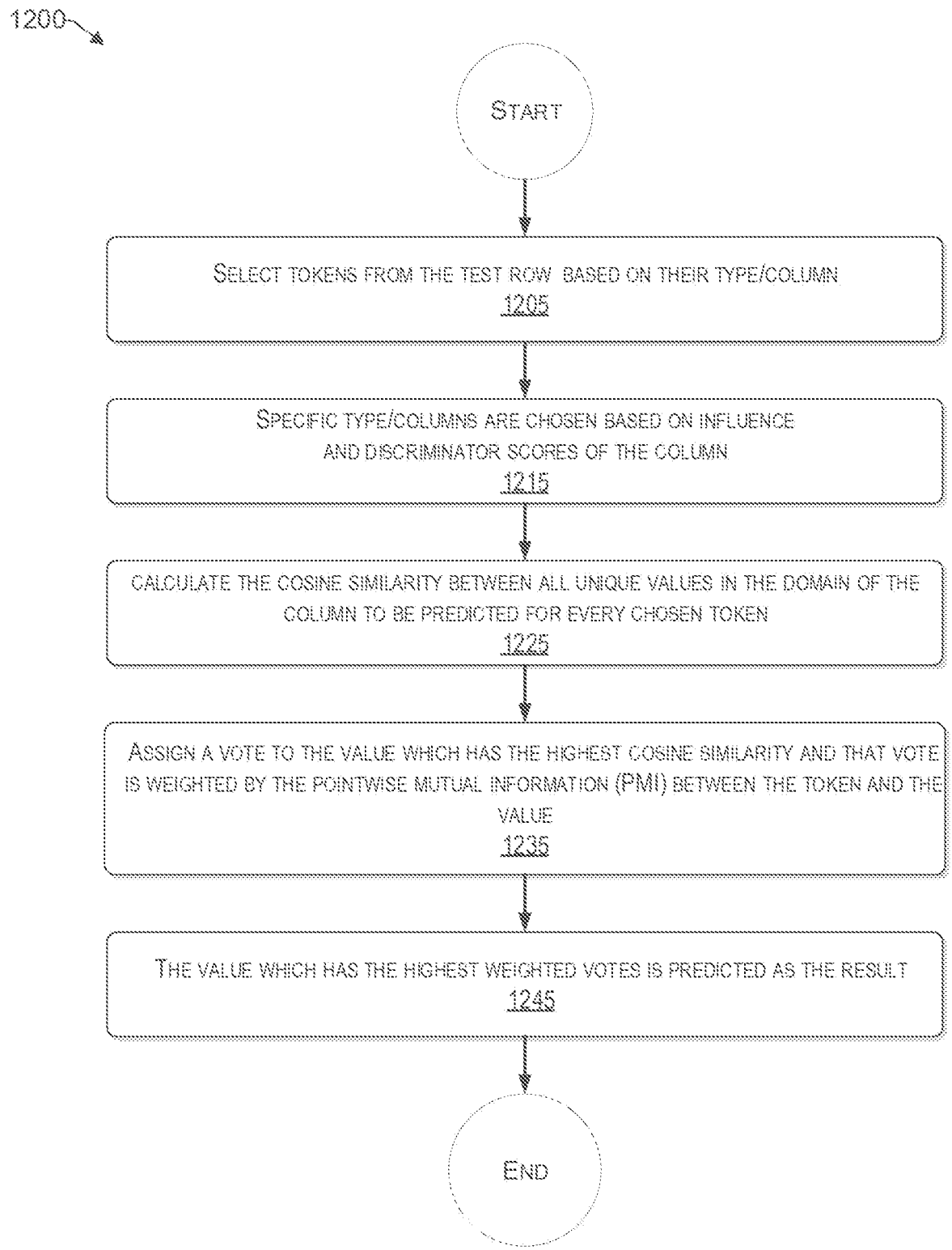
FIG. 12 is a flowchart illustrating a computer-implemented method of performing a voting operation based on an Artificial Intelligence-powered database (AIDB) training model, consistent with an illustrated embodiment.

With the foregoing overview of the example architecture, it may be helpful now to consider a high-level discussion of example processes. To that end, in conjunction with FIGS. 1-10B, FIGS. 11 and 12 depict respective flowcharts 1100, 1200 illustrating various aspects of a computer-implemented method, consistent with an illustrative embodiment. FIGS. 11 and 12 are shown as a collection of blocks, in a logical order, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

FIG. 11 is a flowchart illustrating a computer-implemented method of performing a task based on an AIDB training model, consistent with an illustrated embodiment.

Referring now to FIG. 11, at operation 1105, vector embeddings are generated describing a training data input from a database for unsupervised training of a machine learning model. The database is an AI-powered database. Although the training of a machine learning model by an AI-powered database is traditionally supervised, in this embodiment, the training of the machine learning model is unsupervised. The machine learning model is trained so that, for example, a transaction vector can be built for an incoming unseen row using vectors from the training data. For example, each row receives a unique vector capturing the behavior of an entire transaction (e.g., in a fraud prediction operation).

At operation 1115, the test vector embeddings are generated with regard to an unseen data of one or more rows of the database by using the generated plurality of vector embeddings.

At operation 1125, there is an identification of one or more vector embeddings describing the training data that are a closest match to the test vector embedding.

At operation 1135, a task is automatically determined based on the unseen data. The task is included but not limited in any way to a prediction task, such as row matching, or an entity resolution task, a classification task, a cognitive intelligence query, etc. In the case of a prediction task, the values of any column can be predicted from the structured data. In addition, this approach is interpretable and transparent when compared to other complex deep learning approaches for structured data.

At operation 1145, the task is performed using the trained machine learning model. The prediction task can handle null values in the database and provide imputation.

FIG. 12 is a flowchart illustrating a computer-implemented method of performing a voting operation based on an AIDB training model, consistent with an illustrated embodiment. At operation 1205, tokens from a test row are selected based on their type/column. For example, the tokens belong to a particular column. Moreover, in a row, choose the values which are all numeric types/belonging to certain columns like Merchant, Amount, etc.

At operation 1215, specific type columns are chosen based on influence and discriminator scores of the column.

At operation 1225, the cosine similarity is calculated between all unique values in the domain of the column to be predicted for every chosen token.

At operation 1235, a vote is assigned to the value that has the highest cosine similarity. That vote is weighted by the PMI between the token and the value.

At operation 1245, the value that has the highest weighted votes is predicted as the result. For example, there may be a plurality of values present that have been weighted by the vote assigned in operation 1235. The value with the highest weight votes is predicted to be the result.

Example Particularly Configured Computer Hardware Platform

Figure 13:
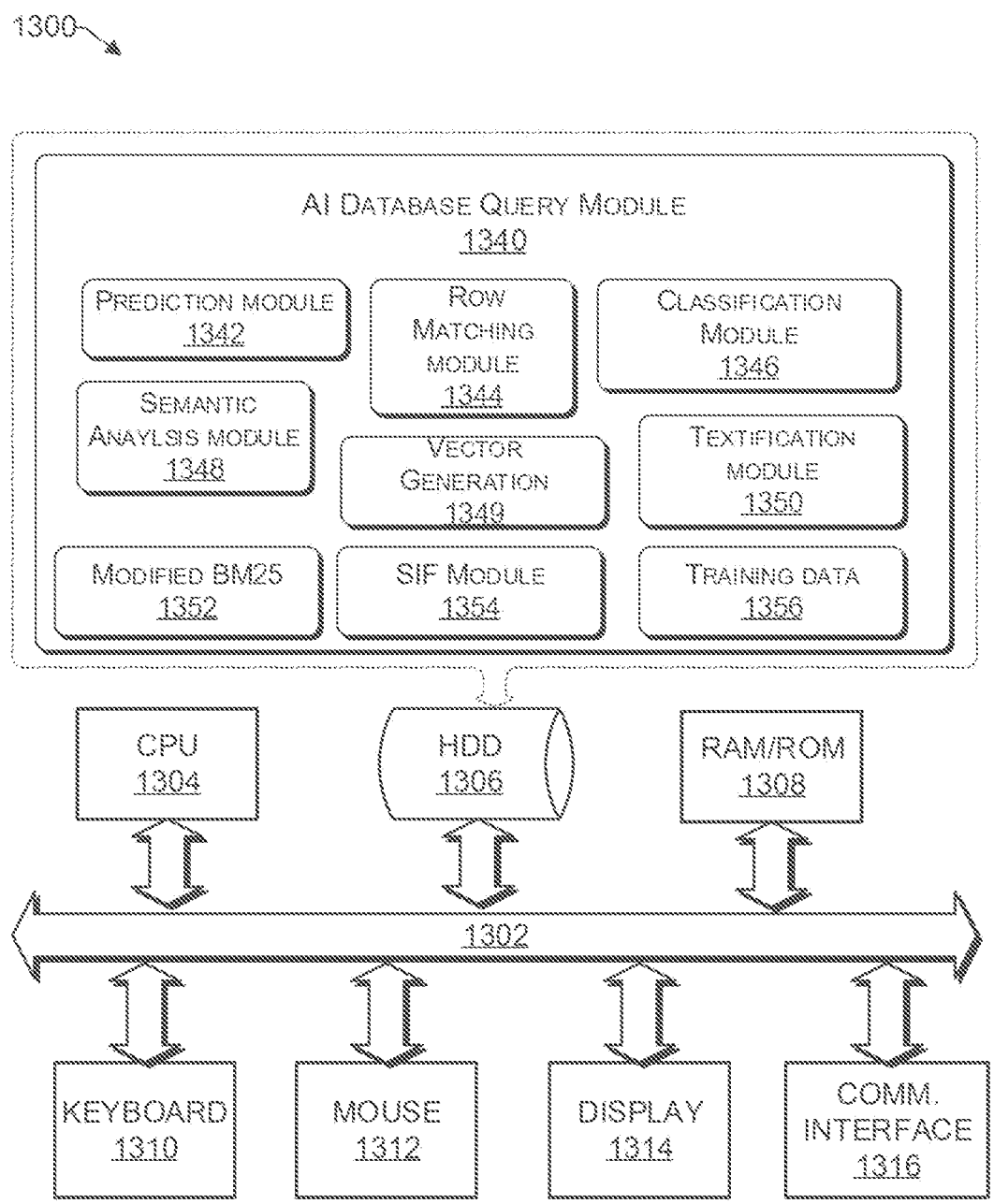
FIG. 13 is a functional block diagram illustration of a computer hardware platform for, consistent with an illustrative embodiment.

FIG. 13 provides a functional block diagram illustration 1300 of a computer hardware platform. In particular, FIG. 13 illustrates a particularly configured network or host computer platform 1300, as may be used to implement the methods shown in FIGS. 11 and 12.

The computer platform 1300 may include a central processing unit (CPU) 1304, a hard disk drive (HDD) 1306, random access memory (RAM) and/or read-only memory (ROM) 1308, a keyboard 1310, a mouse 1312, a display 1314, and a communication interface 1316, which are connected to a system bus 102. The HDD 1306 can include data stores.

In one embodiment, the HDD 1306, has capabilities that include storing a program that can execute various processes, such as machine learning, predictive modeling, classification, updating model parameters. The AI database Query Module 1340 includes a processor configured to control AI database query operations including generating vector embeddings. While the modules 1342 through 1356 are shown as individual modules for illustrative purposes, multiple functionalities may be combined in to fewer modules than shown.

A prediction module 1342 is configured to perform a prediction query to make an inference about unseen data. The prediction module can be used to control performing tasks on unseen data such as row matching (generally used for entity resolution and pattern identification), classification, and/or semantic analysis using other Cognitive Intelligence Queries on unseen data in conjunction with a row matching module 1344, a classification module 1346, and a semantic analysis module 1348, respectively. The vector generation module 1349 can be configured to generate a vector for an unseen row of data. A weighted average of vectors (generated during training) representing tokens in the unseen row is computed. The weights can be assigned by at least two methods including a modified BM25 (as discussed above) by the modified BM25 module, and by a smoothing inverse function (SIF) module 1354. The textification module 1350 is configured, for example, to convert a test row of unseen data into an AIDB readable format. The training data 1356 is used to train a model as discussed above, such as a machine learning prediction model.

Example Cloud Platform

As discussed above, functions relating to the low bandwidth transmission of high definition video data may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 14:
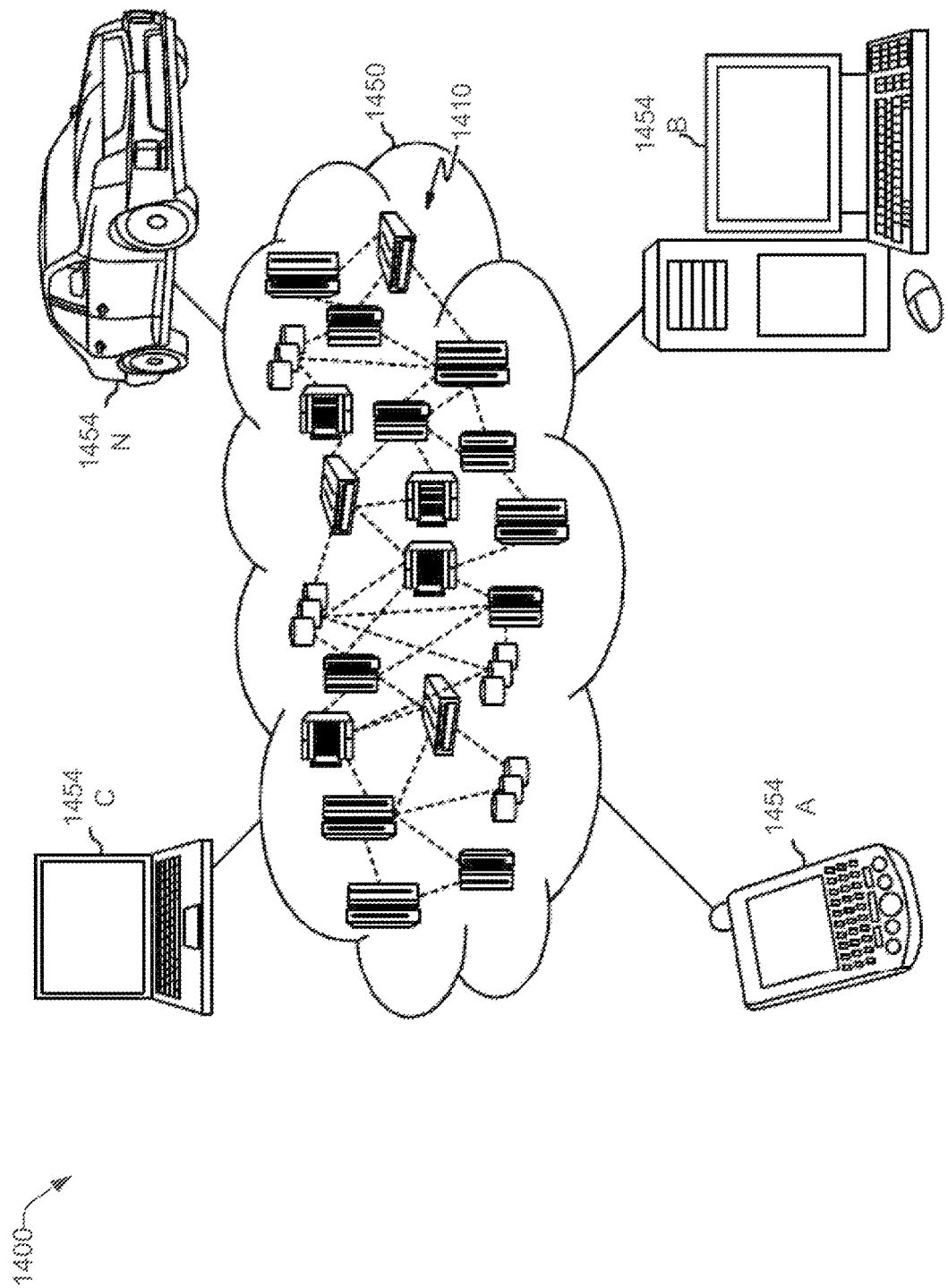
FIG. 14 depicts an illustrative cloud computing environment, consistent with an illustrative embodiment.

Referring now to FIG. 14, an illustrative cloud computing environment 1400 utilizing cloud computing is depicted. As shown, cloud computing environment 1400 includes cloud 1450 having one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1400 to offer infrastructure, platforms, and/or software as services for which a cloud consumer does not need to maintain resources on a local computing device. It is understood that the types of computing devices 1454A-N shown in FIG. 14 are intended to be illustrative only and that computing nodes 1410 and cloud computing environment 1400 can communicate with any type of computerized device over any type of network and/or network addressable connection (e.g., using a web browser).

Figure 15:
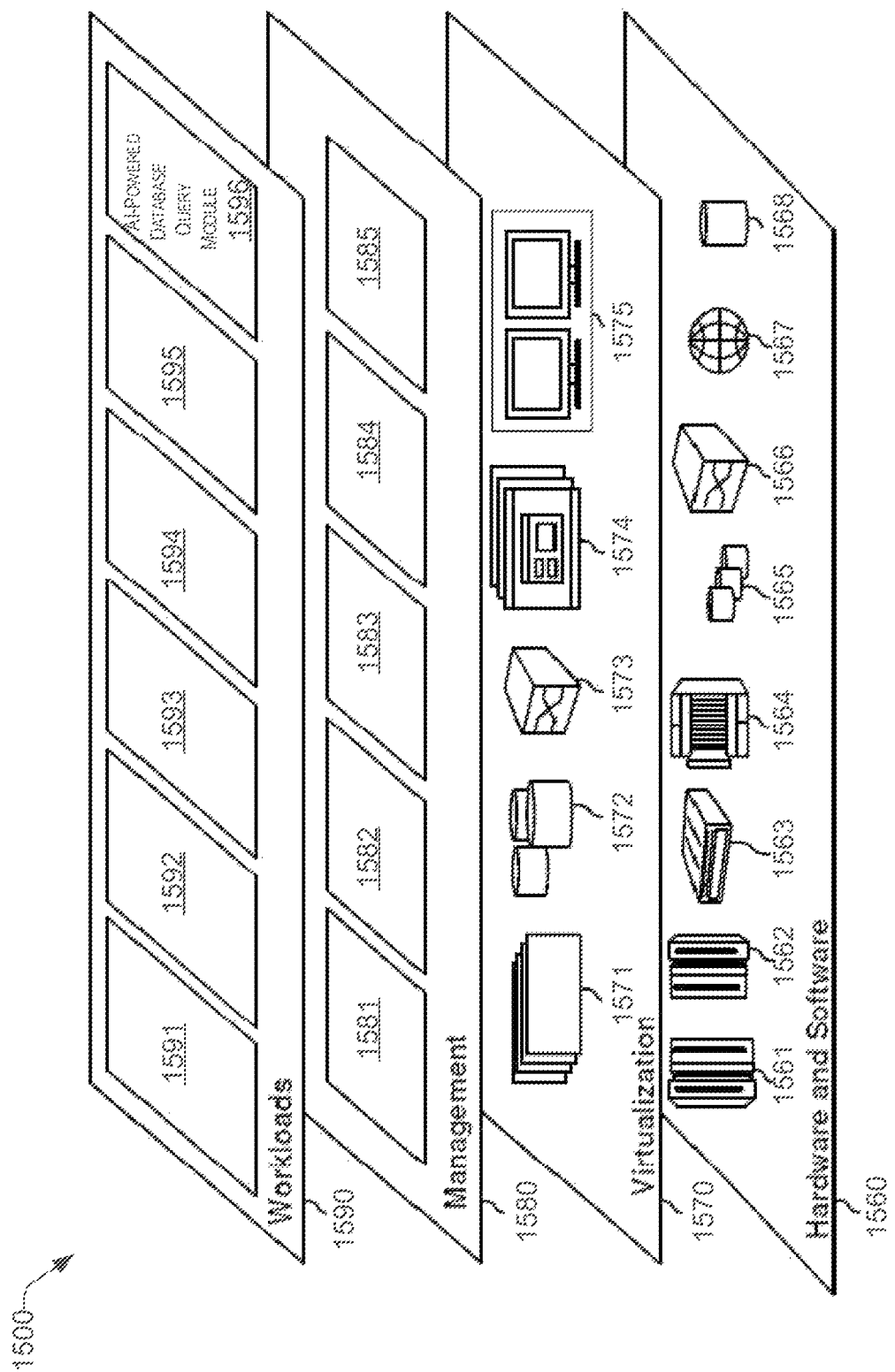
FIG. 15 depicts a set of functional abstraction layers provided by a cloud computing environment, consistent with an illustrative embodiment.

Referring now to FIG. 15, a set of functional abstraction layers 1500 provided by cloud computing environment 1400 (FIG. 14) is shown. It should be understood in advance that the components, layers, and functions shown in FIG. 15 are intended to be illustrative only and embodiments of the disclosure are not limited thereto. As depicted, the following layers and corresponding functions are provided:

Hardware and software layer 1560 include hardware and software components. Examples of hardware components include: mainframes 1561; RISC (Reduced Instruction Set Computer) architecture based servers 1562; servers 1563; blade servers 1564; storage devices 1565; and networks and networking components 1566. In some embodiments, software components include network application server software 1567 and database software 1568.

Virtualization layer 1570 provides an abstraction layer from which the following examples of virtual entities may be provided: virtual servers 1571; virtual storage 1572; virtual networks 1373, including virtual private networks; virtual applications and operating systems 1574; and virtual clients 1575.

In one example, management layer 1580 may provide the functions described below. Resource provisioning 1581 provides dynamic procurement of computing resources and other resources that are utilized to perform tasks within the cloud computing environment. Metering and Pricing 1582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1583 provides access to the cloud computing environment for consumers and system administrators. Service level management 1584 provides cloud computing resource allocation and management such that required service levels are met. Service Level Agreement (SLA) planning and fulfillment 1585 provide pre-arrangement for, and procurement of, cloud computing resources for which a future requirement is anticipated in accordance with an SLA.

Workloads layer 1590 provides examples of functionality for which the cloud computing environment may be utilized. Examples of workloads and functions which may be provided from this layer include: mapping and navigation 1591; software development and lifecycle management 1592; virtual classroom education delivery 1593; data analytics processing 1594; transaction processing 1595; and an AI-Powered Database Query module 1596 configured to perform queries of an AI-powered database based on unsupervised training of a machine learning model producing database embeddings to perform tasks including but not limited in any way to prediction, classification, entity resolution, and fraud detection, as discussed herein above.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method of performing queries using Artificial Intelligence database (AIDB) embeddings, the method comprising:
   generating a plurality of vector embeddings describing a training data from a database for training a machine learning model;
   generating a test vector embedding from an unseen data that has not been used for training an AIDB model, comprising one or more rows of the database, by using the plurality of vector embeddings;
   identifying one or more vectors from the plurality of vector embeddings describing the training data that are a closest match to the test vector embedding;
   determining a task based upon the unseen data, comprising a classification operation including generating vectors of the unseen data using weighted averages for combinations of tokens in a test row of the unseen data, and voting among the generated vectors based on a highest similarity; and
   performing the determined task using the trained machine learning model.

2. The computer-implemented method of claim 1, wherein the training of the machine learning model is unsupervised, and the performing of the determined task comprises performing at least one of a row matching, a classification, or a semantic analysis using cognitive intelligence queries.

3. The computer-implemented method of claim 2,
   wherein the determined task comprises a prediction task; and
   the method further comprises performing the prediction task using the trained machine learning model.

4. The computer-implemented method of claim 2, wherein performing the determined task comprises filling in missing values in the database.

5. The computer-implemented method of claim 2, wherein the voting among the generated vectors is based on a highest cosine similarity.

6. The computer-implemented method of claim 5, wherein the weighted averages are computed by performing a Modified Best Matching (BM) 25 operation using AIDB specific metrics and a modified average sentence length combined with an Inverse Document Frequency (IDF) to generate weights for token vectors.

7. The computer-implemented method of claim 5, wherein the weighted averages are computed by performing a Smoothing Inverse Frequency (SIF) operation comprising:
   performing test row embedding by assigning a weight to one or more token vectors that are selected based on a high influence and discriminatory score;
   wherein the assigned weight for each token vector is its inverse frequency from training data; and
   averaging the token vectors to produce a representative test row vector.

8. The computer-implemented method of claim 5, further comprising weighting the generated vectors by a pointwise mutual information (PMI) of the combination of tokens in the test row.

9. The computer-implemented method of claim 2, wherein performing the identified task comprises a Cognitive Intelligence Query for unseen data.

10. A computer-implemented method of performing queries using Artificial Intelligence database (AIDB) embeddings, the method comprising:
    textifying data from a database including generating data specific statistics;
    training a machine learning model using the AIDB with the textified data;
    textifying an unseen data that has not been used for training an AIDB model, comprising one or more rows of the database;
    determining a prediction task based upon the textified unseen data, comprising a classification operation including generating vectors of the unseen data using weighted averages for combinations of tokens in a test row of the unseen data, and voting among the generated vectors based on a highest similarity; and
    selecting a method to perform the prediction task based on the trained machine learning model.

11. The computer-implemented method of claim 10, further comprising:
    performing the prediction task; and
    providing an interpretability score.

12. A computing device for performing queries using Artificial Intelligence database (AIDB) embeddings, the computing device comprising:

a processor;

a memory coupled to the processor, the memory storing instructions to cause the processor to perform acts comprising:

generating a plurality of vector embeddings describing a training data from a database for unsupervised training of a machine learning model;

generating a test vector embedding from an unseen data that has not been used for training an AIDB model, comprising one or more rows of the database, by using the plurality of vector embeddings;

identifying one or more vectors from the plurality of vector embeddings describing the training data that are a closest match to the test vector embedding;

determining a task based upon the unseen data comprising a classification operation;

performing the determined task using the trained machine learning model;

generating vectors of the unseen data using weighted averages for combinations of tokens in a test row of the unseen data; and voting to rank the generated vectors based on a highest similarity.

13. The computing device of claim 12, wherein:

the generated test vector embeddings are configured to describe the training data for training a machine learning prediction model;

the determined task comprises a prediction task; and the instructions cause the processor to perform an additional act comprising performing the prediction task using the trained machine learning prediction model.

14. The computing device of claim 12, wherein the instructions cause the processor to perform an additional act comprising filling in missing values in the AIDB.

15. The computing device of claim 12, wherein the voting to rank the generated vectors is based on a highest cosine similarity.

16. The computing device of claim 15, wherein the instructions cause the processor to perform an additional act comprising determining a pointwise mutual information (PMI) of the combination of tokens in the test row based on the textified training data for weighted voting.

17. The computing device of claim 12, wherein the determined task comprises a row-matching operation.

18. The computing device of claim 12, the determined task comprises a Cognitive Intelligence Query.

19. The computing device of claim 12, wherein the instructions cause the processor to perform additional acts comprising:

textifying training data from the AIDB including generating data specific statistics; and training a machine learning model using the AIDB with the textified data.

20. The computing device of claim 19, wherein the instructions cause the processor to perform an additional act comprising converting unseen data from the database to an AIDB recognizable format.

* * * * *